Jan. 27, 1925.

D. G. JACK 1,524,517

APPARATUS FOR HEATING WATER IN CIRCULATING AND OTHER SYSTEMS

Filed June 21, 1924

INVENTOR
Douglas Gordon Jack
by Hervey, Barber & McKee
Attys

Patented Jan. 27, 1925.

1,524,517

UNITED STATES PATENT OFFICE.

DOUGLAS GORDON JACK, OF GISBORNE, NEW ZEALAND.

APPARATUS FOR HEATING WATER IN CIRCULATING AND OTHER SYSTEMS.

Application filed June 21, 1924. Serial No. 721,600.

*To all whom it may concern:*

Be it known that DOUGLAS GORDON JACK, of Gisborne, in the Province of Hawkes Bay of the Dominion of New Zealand, citizen of the British Empire, has invented certain new and useful Improvements in and Relating to Apparatus for Heating Water in Circulating and Other Systems, of which the following is a specification.

This invention relates to apparatus for heating water in circulating and other systems by means of electric heating elements inserted in the said apparatus. The precise construction of electric heating elements are not part of the said apparatus or invention.

A further important feature of the said invention is the design of the casing containing the heating elements. This casing is in two sizes, the smaller size being designed to take heating elements up to 1000 watt capacity and the larger size up to 2000 watt capacity. The said casing in each case is so designed that the water in its circulation by thermo-siphon action through the apparatus, is thrown on to the heating elements, so that the maximum possible amount of heat is imparted to the water. It is also further claimed that the heated water has a free and unobstructed flow on the delivery end of the said apparatus.

A distinct advantage of having a free and unrestricted flow of the heated water on the delivery end of the said apparatus, is that if the water in the said casing should be heated to boiling point, in which case steam will be formed with a consequent large increase in volume, there will be no tendency of the water in the casing being forced back through the intake end and thereby leaving the heating elements surrounded by steam only, resulting in overheating and possible damage to the heating elements.

In the accompanying drawings I have shown how my said invention may be conveniently and advantageously carried into practice and manufactured. In the following reference to the drawings the term "1000 watt unit" applies to the design of the said apparatus for use of elements up to 1000 watt capacity and the term "2000 watt unit" applies to the design of the said apparatus for use of elements up to 2000 watt capacity.

Figure 1:
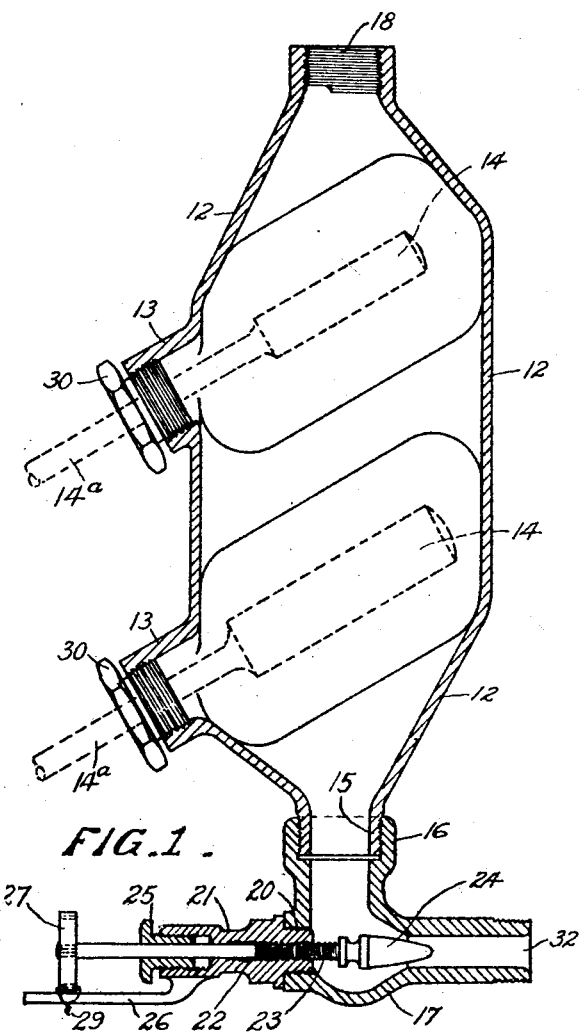
Figure 1 is a vertical section on centre line of the 1000 watt unit, showing the heating elements 14 in position. The exact construction of these heating elements 14 are not part of the invention.
Figure 2:
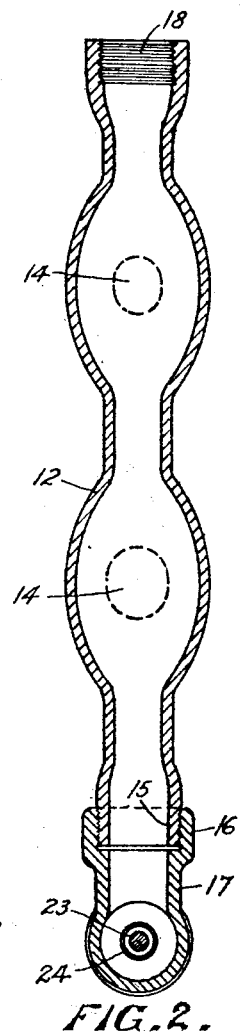
Figure 2 is a vertical section taken at right angles to Fig. 2 on centre-line of the 1000 watt unit.
Figure 3:
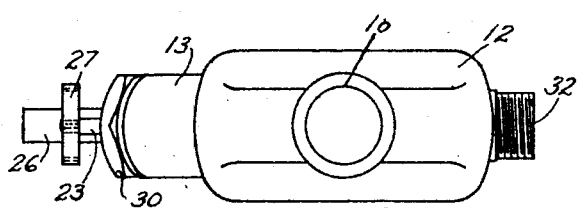
Figure 3 is a view looking on top or at the delivery end of the 1000 watt unit.

The relatively flat and rectangular casing, 12, is provided on either side with oppositely disposed and outwardly bulging portions, which extend diagonally across the entire casing for the purpose of receiving electric heating means, 14. As is illustrated in Figure 1 of the accompanying drawing, the electric heating members, 14, are arranged diagonally or parallel with the diagonal chambers formed by the bulging portions, for the purpose of receiving a relatively long heating element. The lower and upper ends of the casing, 12, are formed with frusto-conical portions and threaded portions or necks, 15 and 18. The ends being formed in this manner, it will be readily seen, permits of a highly efficient and even distribution of the liquid to and from the electric heating members, 14. Inasmuch as the flow of the liquid is upward through the casing, 12, I have provided the lower heating member, 14, of greater heating power than the upper heating member, 14, as the lower heating element is subjected to liquid of a cooler temperature.

The valve body 17 has a threaded boss 20 into which is screwed the valve-stem gland 21. This gland 21 has an internal thread 22 at its inner end into which the stem 23 to the parabolic valve 24 is screwed, as shown in Figure 1. On the outer end of gland 21 a packing nut 25 is fitted.

An arm 26 is cast on the gland 21 for the purpose of sealing the parabolic valve 24 when properly adjusted. The parabolic valve stem head 27 has four small holes 28 drilled near its circumference, through these holes 28 a wire 29 may be threaded and taken over the arm 26 for sealing valve 24 as shown in the drawings. The nuts 30 are screwed in the bosses 13 in the 1000 watt unit and these nuts have a central hole bored through them into which the stem 14$^a$ of the electrical heating elements 14 is screwed or soldered.

The valve stem head 27 is made or stamped with the range of diameter of inlet orifice 32 when the adjustable parabolic valve or cone valve 24 is fitted to the apparatus.

In the case of bushings 31 being used the exact diameter of hole or bore will be stamped on head of plug 33.

The construction of the apparatus may be somewhat modified, if desired, without departing from the nature of my invention. For instance a boss may be provided for the attachment of a thermostat to the casing 12.

The cold water flows in to the inlet end 32 of valve body 17 by thermo-siphon action, past the parabolic valve 24 or cone valve if fitted or in the event of neither of these valves being fitted, through the bushing 31 into the casing 12 where water comes into contact with the electric heating elements 14 absorbing heat therefrom, the heated water then passes up through the delivery end 18 of casing 12 into the adjacent hot water cylinder or container as the case may be, from which it may be drained off.

I claim:—

A liquid heater of the class described, comprising a relatively flat casing having diagonally disposed outwardly bulging portions extending entirely across the casing, the ends of said casing being extended to form frusto-conical portions and terminating in outlet and inlet liquid receiving openings, and electric heating means disposed within the diagonally bulging portions.

In testimony whereof he affixes his signature in presence of two witnesses.

DOUGLAS GORDON JACK.

Witnesses:
JAMES BLAIR,
FREDERICK HOWARD FORGE.